Figure 1:
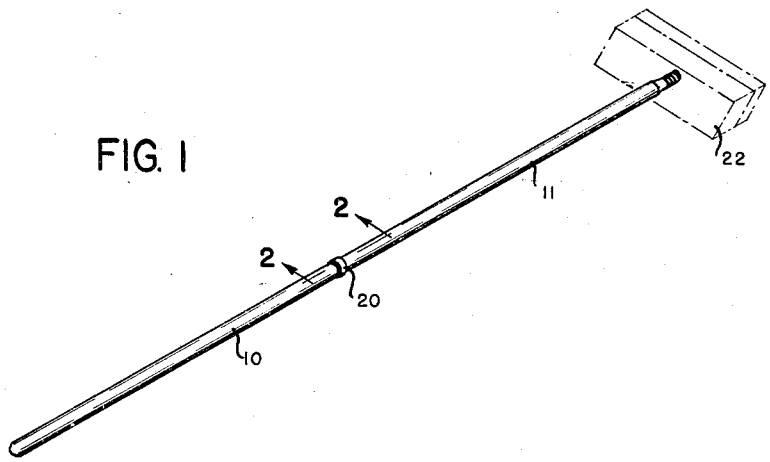

May 13, 1958     J. C. STANLEY ET AL     2,834,625

MULTI-PART HANDLE

Filed Sept. 18, 1957

INVENTORS
JOHN C. STANLEY
GEORGE Le GOFF
ROBERT B. MOORE, JR
CHARLES F. WILLIAMS

BY *A. Yates Dowell*

ATTORNEYS

United States Patent Office 2,834,625
Patented May 13, 1958

2,834,625
MULTI-PART HANDLE

John C. Stanley, Corinth, Miss., George Le Goff, Bangor, Maine, and Robert B. Moore, Jr., and Charles F. Williams, Corinth, Miss., assignors to Gateway Corporation, Corinth, Miss.

Application September 18, 1957, Serial No. 684,733

1 Claim. (Cl. 287—125)

This invention relates to the manufacture and sale of commodities of various kinds, distributed and sold through various channels including hardware stores and the like, the invention being concerned with articles of relatively hard wood or kindred material with surface portions relatively smooth in order that they may be gripped in the hand without producing blisters or causing other injury as a result of their contact with the skin.

The invention is concerned primarily to elongated articles of wood such as shafts or the like used as handles for mops, brooms and other objects and ordinarily composed of a single length of material and sold attached or independently as a replacement.

Handles for brooms, mops and other implements used about the household, on the farm and elsewhere have been made of relatively long solid sticks or shafts and when forming part of the broom have been referred to as broomsticks. Due to their length, tools or devices having long handles of this kind have involved problems as to storage, transportation, display, etc., and it has been desirable to produce a handle of two or more parts but this problem has not been solved, some of the reasons being that the handle made of more than a single shaft would not be as strong or would be too cumbersome or expensive.

It is an object of the invention to overcome the difficulties enumerated and to provide a relatively simple inexpensive multiple part handle of relatively hard wood, the parts of which may be readily assembled or taken apart, which will fulfill the requirements of a shaft or handle of a single piece of material.

Another object of the invention is to provide a two-piece handle of relatively hard wood, to replace the conventional handle which is ⅞" in diameter, and which will have a joint to make it possible for the two parts of the handle to be readily joined or separated with the cooperating ends of the two parts of the handle provided with externally and internally threaded complementary portions in which the externally threaded portion is approximately ⅝" in diameter and the wall of the internally threaded member is approximately ⅛" thick in addition to the depth of the threads per se and will be suitably and adequately reinforced by a sleeve or ferrule to provide additional strength.

Another object of the invention is to provide a two-part handle composed of threadedly connected sections in which the alternate ribs and grooves are flat and the inner ends of the cooperating threaded portions are enlarged and unthreaded to improve the tightness and strength of the joint.

Figure 2:
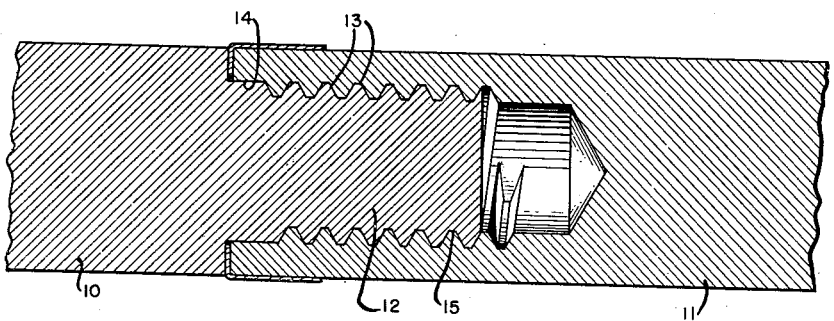
Figure 3:
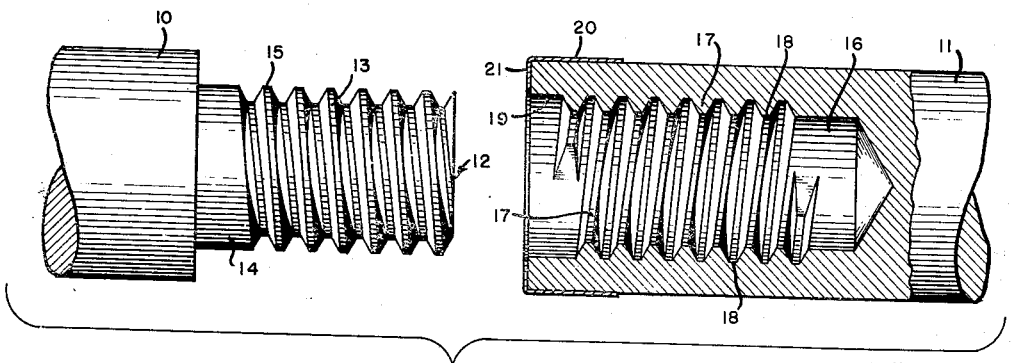

Other objects and advantages of the invention will be apparent from the following description taken in conjunction with the accompanying drawing wherein:

Fig. 1 is a perspective view of a novel handle constructed in accordance with the present invention;

Fig. 2 an enlarged fragmentary sectional view taken on the line 2—2 of Fig. 1; and Fig. 3 a fragmentary view, on a similarly enlarged scale, illustrating the mating ends of the two-piece handle in disassociated relationship.

Briefly stated the present invention is a two-piece handle composed of a pair of wooden shafts disposed in axial alignment with complementary externally and internally threaded portions with the internally threaded portion provided with an external reinforcing sleeve and with the threaded portions of such diameter that a joint of maximum strength is provided.

The handle of the present invention comprises a pair of shafts 10 and 11, the shaft 10 being provided with a reduced extremity 12 having external threads 13 and an unthreaded inner end portion 14. Desirably, the threads 13 are formed with flattened crests 15 and a similarly flattened portion is provided at the depth or root of each thread.

The opposed extremity of the shaft 11 is provided with an axial recess or bore 16 which is internally threaded for a portion of the length thereof as indicated at 17. It will be noted that the threads 17 are complementary to the threads 13 and are provided with flattened portions 18 whereby a snug fit is assured. Further, the threads 17 terminate short of or are spaced from the extremity of the shaft 11, thus providing an enlarged recess 19 for the reception of the portion 14 of the threaded extremity on the shaft 10.

An external sleeve or ferrule 20, desirably of metal, is provided to reinforce the extremity of the shaft 11 and this ferrule has an in-turned or radial flange 21, secure frictional engagement being provided between the ferrule 20 and shaft 11 to prevent inadvertent separation therebetween.

With this construction the two sections of the handle thread together tightly to provide a solid unitary shaft which fulfills the usual functions of the conventional shaft used as a handle for tools of various kinds and of relatively slim size, being only ⅞" in exterior diameter with the threaded portions approximately ⅝" in diameter leaving the wall of the female or internally threaded portion approximately ⅛" in thickness with its free end reinforced by the metal or the like sleeve having a radially disposed end portion. When the parts are assembled, as shown in Fig. 2 of the drawing, the unthreaded portion 14 will be received in the slightly enlarged end of the internally threaded portion of the cooperating shaft and the complementary construction of the respective threaded portions will cause the parts to fit together tightly and solidly as a simple shaft which can be used for a mop 21 or other implement.

It will be understood that where a handle of greater length is required, a plurality of shaft portions such as have been described hereabove may be provided, the novel connection or interengagement of the present invention being employed between adjacent sections.

It will be obvious to those skilled in the art that various changes may be made in the invention without departing from the spirit and scope thereof and therefore the invention is not limited by that which is illustrated in the drawing and described in the specification, but only as indicated in the accompanying claim.

What is claimed is:

A relatively solid two-piece handle for a broom, mop or the like comprising a pair of shaft sections of hard wood and of substantially identical external diameters, one of said shaft sections having a portion of substantial length of reduced diameter and provided with external threads thereon in spaced relation to the junction of said reduced portion with the remaining portion of said shaft section, said threads being provided with flattened crests and base portions, the opposed extremity of the other of said shafts being provided with an axial bore having threads terminating short of the bottom of the bore, the threads of said bore being complementary to the threads on said portion of reduced diameter and being spaced from the free extremity of said bore a distance substantially equal to the length of the unthreaded part of said portion of reduced diameter and providing a cooperating bearing portion for a snug fit therewith, and a reinforcing sleeve surrounding the free extremity of said other shaft portion, said reinforcing sleeve having an integral radial flange with a central aperture of a diameter to accommodate the unthreaded part of said portion of reduced diameter.

References Cited in the file of this patent

UNITED STATES PATENTS

| | | |
|---|---|---|
| 184,718 | Lewis | Nov. 28, 1876 |
| 270,661 | Hall | Jan. 16, 1883 |
| 468,529 | Beardsley | Feb. 9, 1892 |
| 841,336 | North | Jan. 15, 1907 |
| 968,853 | Jeavons | Aug. 30, 1910 |
| 2,232,135 | Pate | Feb. 18, 1941 |